United States Patent [19]
Ohsuga et al.

[11] Patent Number: 5,617,824
[45] Date of Patent: Apr. 8, 1997

[54] AIR INTAKE EQUIPMENT FOR INTERNAL COMBUSTION ENGINE

[75] Inventors: Minoru Ohsuga; Jun'ichi Yamaguchi, both of Hitachinaka; Ryoichi Komuro, Hitachi; Masakichi Momono, Hitachinaka, all of Japan

[73] Assignee: Hitachi, Ltd., Tokyo, Japan

[21] Appl. No.: 428,486

[22] Filed: Apr. 27, 1995

[30] Foreign Application Priority Data

Apr. 28, 1994 [JP] Japan .................................. 6-091062

[51] Int. Cl.$^6$ ..................................................... F02B 31/00
[52] U.S. Cl. ..................................... 123/308; 123/188.14
[58] Field of Search .................................. 123/308, 432, 123/188.14

[56] References Cited

U.S. PATENT DOCUMENTS

| | | | |
|---|---|---|---|
| 4,625,687 | 2/1986 | Hatamura et al. | 123/432 |
| 4,669,434 | 6/1987 | Okumura et al. | 123/432 |
| 4,726,341 | 2/1988 | Muranaka et al. | 123/432 |

*Primary Examiner*—Erick R. Solis
*Attorney, Agent, or Firm*—Antonelli, Terry, Stout & Kraus, LLP

[57] ABSTRACT

An improved intake equipment, in which the formation of a liquid fuel film due to deflection of the fuel can be avoided, has a plurality of independent air intake pipes connected to a combustion chamber, for introducing air thereto, collectors connected to the independent air intake pipes, for distributing the introduced air into them, and a throttle valve connected to the collectors, for controlling the amount of air flow. A fuel supplying mechanism is provided on a wall of the independent intake pipes, for supplying fuel to the air and mixing the air and fuel, and a deflection mechanism is provided for deflecting the air flow of the independent intake pipes so as to avoid undesirable deflection of the fuel.

2 Claims, 9 Drawing Sheets

| TP (mse) | | 2 | 3 | 4 | 5 | 6 | 7 | 8 | 9 | 10 | 11 | 12 |
|---|---|---|---|---|---|---|---|---|---|---|---|---|
| Ne (rpm) | | 1.13 | 1.38 | 1.63 | 1.81 | 2.06 | 2.38 | 2.75 | 3.19 | 3.63 | 4.13 | 4.56 |
| 0 | 400 | | | | | | | | | | | |
| 1 | 800 | | | | | | | | | | | |
| 2 | 1200 | | 20.9 | 21.6 | 21.6 | 21.9 | 21.4 | 20.9 | 20.9 | 20.0 | 15.7 | |
| 3 | 1600 | | 18.1 | 19.2 | 22.9 | 22.9 | 22.7 | 21.9 | 20.9 | 20.5 | 18.1 | |
| 4 | 2000 | | 18.1 | 18.8 | 23.5 | 24.1 | 24.1 | 23.5 | 22.9 | 20.7 | 18.1 | |
| 5 | 2400 | | 20.0 | 21.9 | 22.9 | 23.2 | 23.2 | 23.2 | 22.7 | 22.4 | 20.0 | |
| 6 | 2800 | | 18.4 | 22.7 | 22.7 | 22.7 | 22.7 | 20.9 | 20.0 | 18.1 | 17.6 | |
| 7 | 3200 | | 17.6 | 20.0 | 20.0 | 19.6 | 19.4 | 18.4 | 17.6 | 16.5 | 15.7 | |
| 8 | 3600 | | 17.6 | 18.4 | 18.3 | 17.9 | 17.8 | 17.6 | 16.5 | 15.7 | 15.3 | |
| 9 | 4000 | | 17.6 | 17.6 | 17.6 | 17.6 | 17.6 | 17.6 | 16.5 | 15.7 | | |
| 10 | 4400 | | | | | | | | | | | |
| 11 | 4800 | | | | | | | | | | | |
| 12 | 5200 | | | | | | | | | | | |

| 2 | 3 | 4 | 5 | 6 | 7 | 8 | 9 | 10 | 11 | 12 |
|---|---|---|---|---|---|---|---|---|---|---|
| 1.13 | 1.38 | 1.63 | 1.81 | 2.06 | 2.38 | 2.75 | 3.19 | 3.63 | 4.13 | 4.56 |
| | | | | | | | 84 | | | |
| | | | | | | | 84 | | | |
| | | | | | | | 84 | 80 | | |
| | | | | | | 84 | 50 | | | |
| | | | | | | 84 | | | | |
| 84 | 84 | 84 | 84 | 84 | 84 | 80 | 70 | 60 | | |
| 80 | 80 | 80 | 80 | 80 | 80 | 70 | 60 | 60 | | |
| 70 | 70 | 70 | 70 | 70 | 70 | 60 | 60 | 50 | 40 | |
| 60 | 60 | 60 | 60 | 60 | 60 | 60 | 50 | 40 | 30 | |
| 60 | 60 | 60 | 60 | 60 | 60 | 50 | 40 | 30 | | |
| | | | | | | | | | | |
| | | | | | | | | | | |
| | | | | | | | | | | |

AIR INTAKE EQUIPMENT FOR INTERNAL COMBUSTION ENGINE

BACKGROUND OF THE INVENTION

The present invention relates to the construction of intake pipes for supplying air and fuel to combustion chambers of an internal combustion engine.

In conventional intake pipes, an air swirl is positively created in combustion chambers of an internal combustion engine in order to increase the efficiency of combustion. However, a high speed air flow may be produced by an intake air deflection unit provided to form the air swirl. If the fuel jet is deflected and it impacts the surface of the walls of the intake pipe and the combustion chamber, a liquid film is formed on the wall surface. Therefore, unburned fuel may remain after combustion. As a result, the emission of hydrocarbons increases.

Further, there have been attempts to decrease the fuel consumption by using a lean burn ratio in which the rate of the air to fuel (A/F ratio) is large. However, in an engine wherein a liquid film is formed on the combustion chamber wall, the efficiency of combustion is low, a stable lean burn condition can not be obtained, and the fuel consumption can not be improved.

SUMMARY OF THE INVENTION

An object of the present invention is to provide an improved engine in which the formation of a liquid film on the wall of the combustion chamber due to deflection of the fuel can be avoided, the emission of unburned hydrocarbons can be decreased, and the state of a lean burn can be stabilized.

According to the present invention, the direction of the injection of air does not intersect or oppose that of the fuel.

Because the injected air does not interfere with the direction of injected fuel, the fuel jet will not be deflected. As a result, the fuel jet will not stick to the inner wall surface of the combustion chamber, and so a liquid film of fuel will not be formed thereon. Accordingly, the emission of unburned hydrocarbon can be decreased, and the state of a lean burn can be stabilized.

DETAIL DESCRIPTION OF THE PREFERRED EMBODIMENTS

Figure 1:
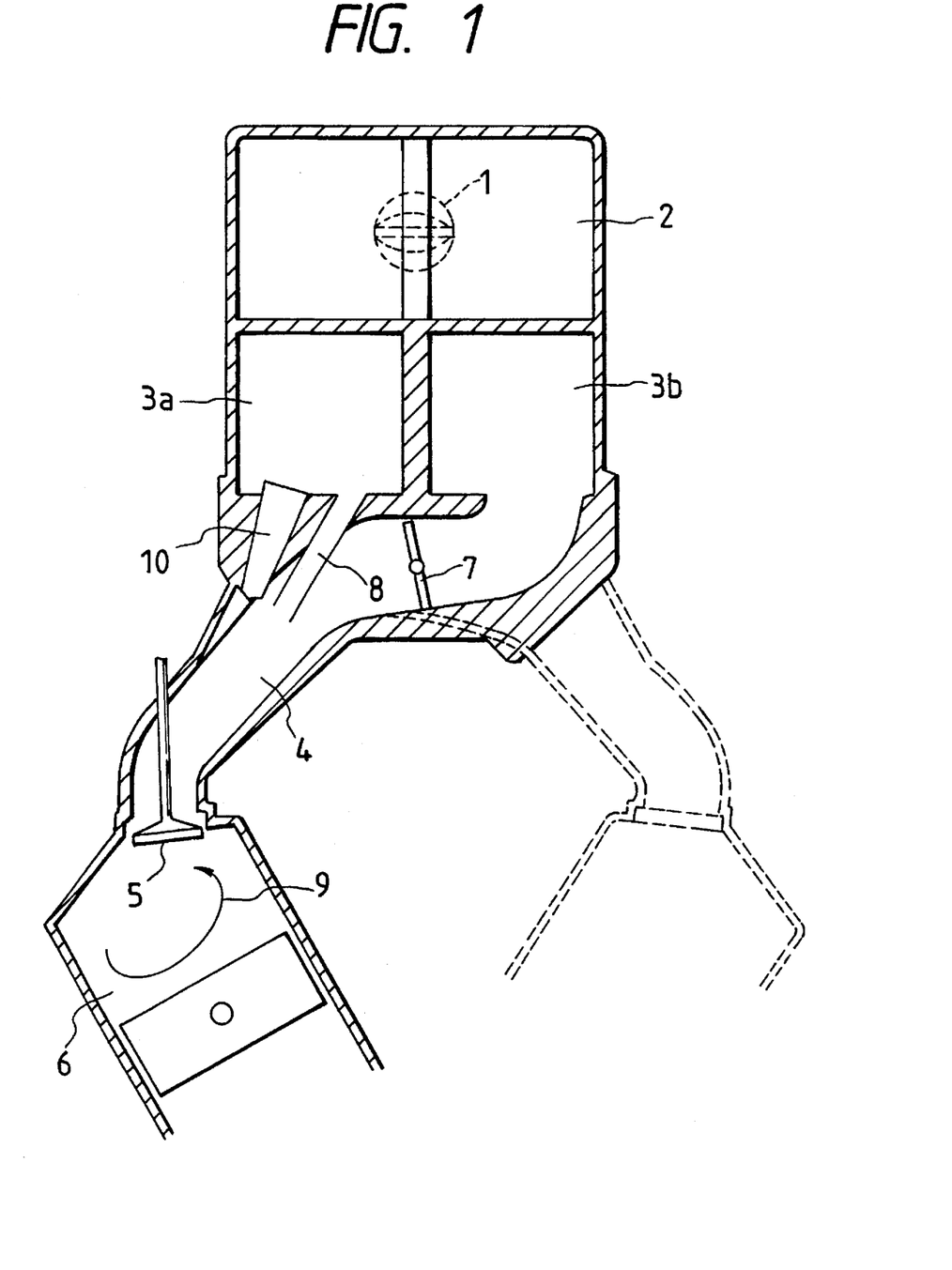
FIG. 1 is a schematic view of an embodiment of the present invention, showing the whole construction of an air intake system.
Figure 2:
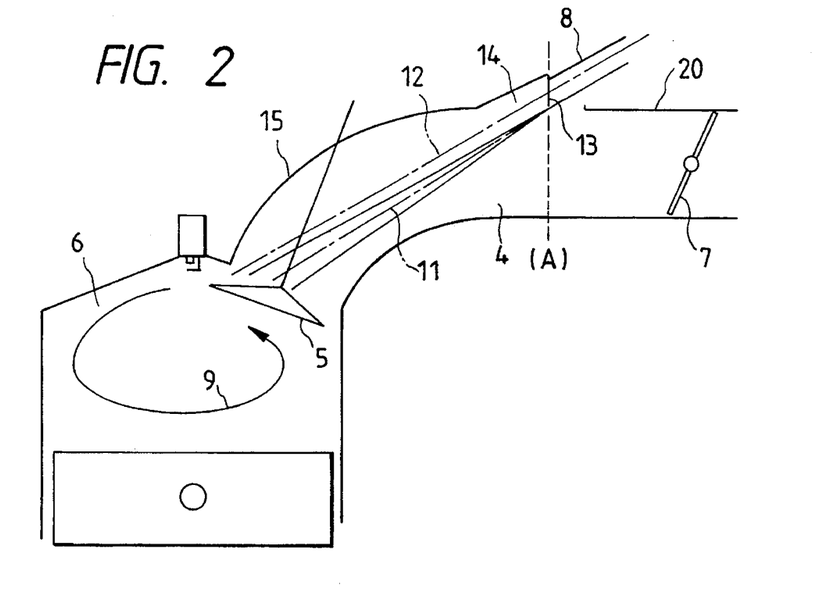
FIG. 2 is a schematic view of the intake pipe shown in FIG. 1.

FIGS. 1 and 2 show an embodiment of the present invention. The intake air supplied in an air passage through a throttle valve 1 passes through an upper collector 2, and then flows to collectors 3a and 3b partitioned left and right. The air is forked from these collectors into an independent intake pipe 4, and flows through an intake valve 5 into a cylinder 6. In order to produce a swirling air flow, there is provided an auxiliary valve 7 to control the air supplied from the collector 3b and an air intake passage 8 which by-passes the auxiliary valve and supplies air from the collector 3a. The auxiliary valve 7 is normally opened. When a lean burn is performed, or when it is desired to improve the combustion during idle operation or at low temperature, the auxiliary valve 7 is closed and the intake air is supplied only from the collector 3a via the air intake passage 8 to the cylinder 6. When a directional air flow is supplied to the position of the intake valve 5, a deflecting flow is produced in the independent intake pipe 4, and then a swirling air flow 9 is produced in the cylinder 6. The fuel is supplied from a fuel injection valve 10. Although FIG. 1 shows an example applied to a V-type engine, it will be appreciated that it can be applied to serial type engines as well.

FIG. 2 shows the directions of the air flow and the fuel jet shown in FIG. 1. An intake pipe 20 is shown on the right side of the dotted line (A), and an engine head 15 is shown on the left side. When the intake air is supplied from the air intake passage 8, which by-passes the auxiliary valve 7, the swirling air flow 9 is produced in the cylinder 6. A fuel injector is not shown in FIG. 2, but the direction of the air flow 12 is matched to that of the fuel jet 11. Therefore, the air flow does not intersect or oppose the fuel jet 11 in any way before both flows reach the intake valve 5. By arranging the flows in this way, the fuel jet 11 directly hits the intake valve 5 without any deflection of the fuel jet due to the high speed air flow 12. If path of the fuel jet 11 were to conflict with the high speed air flow, the fuel jet 11 would impact with a wall surface of the intake pipe 4. In such case, the liquid film formed on the wall surface, of the intake pipe would cause deteriorating of the fuel consumption. However, by making the directions of the air flow 12 and the fuel jet 11 parallel, a swirling air flow can be produced in the cylinder 6 without causing a deviation in the direction of the fuel jet 11. An outlet 13 of the air intake passage 8 is opened at boundary (A), and does not project on the head side. A notch 14 is formed on the head side in order to provide the air flow 12, which is jetted from the air intake passage 8. As shown in FIG. 2, the outlets of the fuel injector and the air intake passage 8 are arranged almost at the same height. In this embodiment, while the air flow 12 aims at and is injected into the gap when the intake valve 5 is opened, the fuel jet 11 aims at and is injected directly toward the intake valve 5. By this construction, the emission of unburned hydrocarbons from the engine can be decreased, and the state of a lean burn can be stabilized.

Figure 3:
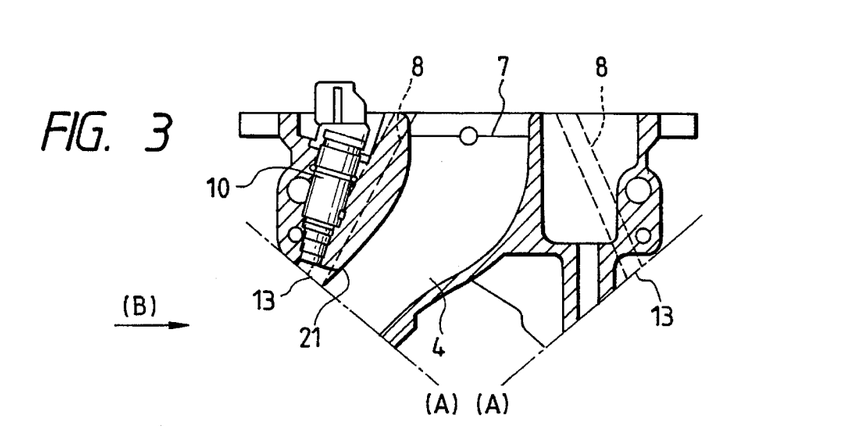
FIG. 3 is a detail view of the air intake passage in the embodiment of FIG. 1, showing the construction of an air intake passage in a V-type of engine.
Figure 4:
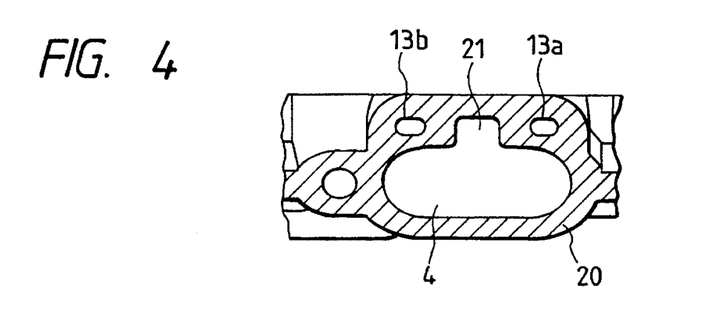
FIG. 4 is a schematic view seen from the direction of arrow B in FIG. 3.

FIGS. 3 and 4 show details of the construction of the air intake passage 8. In FIG. 3, an outlet 13 of the air intake passage 8 is opened at the end portion of the fuel injection valve 10. The construction seen from the direction of arrow (B) is shown in FIG. 4. In FIG. 3, the air intake passages 8 are provided on both sides of the fuel injection valve 10. Namely, there are provided two air intake passages 8 per one cylinder. Therefore, there are two outlets 13a and 13b for the air intake passage 8. Reference numeral 21 designates the opening portion provided to supply the fuel jet 11 from the fuel injection valve 10. These outlets 13a and 13b are provided on both sides of the opening portion 21. Although FIG. 3 shows an example applied to a V-type engine, it will be appreciated that it can also apply to a serial type engine as shown in FIG. 2. The present invention is applicable to engines of all types, such as the serial type engine, a horizontally opposed type engine, and the V-type engine.

Figure 5:
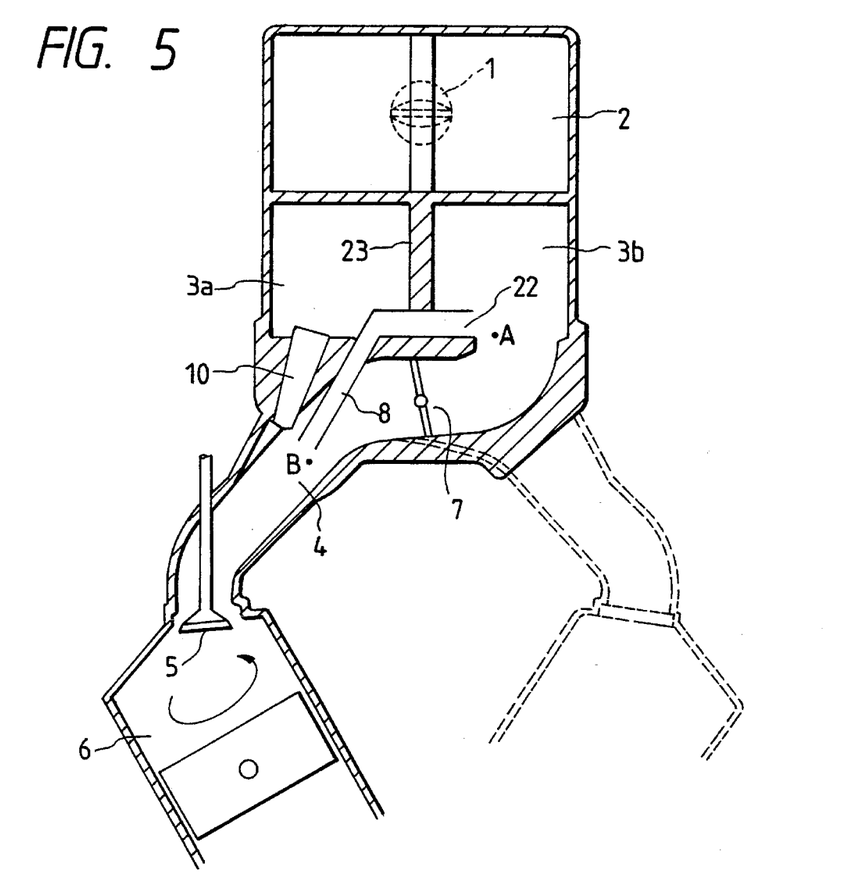
FIG. 5 is a schematic view of a modification of the embodiment of FIG. 1, showing the whole construction of an air intake system.

FIG. 5 shows a variation of the embodiment of the present invention illustrated in FIG. 1. In the V-type engine, the collectors 3a and 3b are partitioned by a partition wall 23. The opening portion 22, which is on the upper stream end of the air intake passage 8, by-passes the auxiliary valve and extends into the collector 3b. If the pressure in the independent intake pipe 4 changes, an intake inertia supercharging occurs. As a result, the cylinder is filled with air. However, if the air intake passage 8 extends into the collector 3a, as seen in FIG. 1, which does not correspond to the independent intake pipe 4, the pressure wave in the independent intake pipe 4 leaks into the collector 3a. Accordingly, the effect of the inertia supercharging is decreased. Therefore, as shown in FIG. 5, the opening portion of the air intake passage 8 provided in the independent intake pipe 4 extends into the collector 3b, which corresponds to the independent intake pipe 4. Because the pressure wave is propagated in a similar way through the independent intake pipe 4 and the air intake passage 8, the effect of the inertia supercharging will not be decreased. It is required to equalize the distances between the points A and B through the independent air intake pipe 4 and between the points A and B through the air intake passage 8 so that a pressure wave may be propagated within the same time. Thereby, the effect of the inertia supercharging can be increased, because both the peaks of the pressure waves will be matched to each other.

Figure 6:
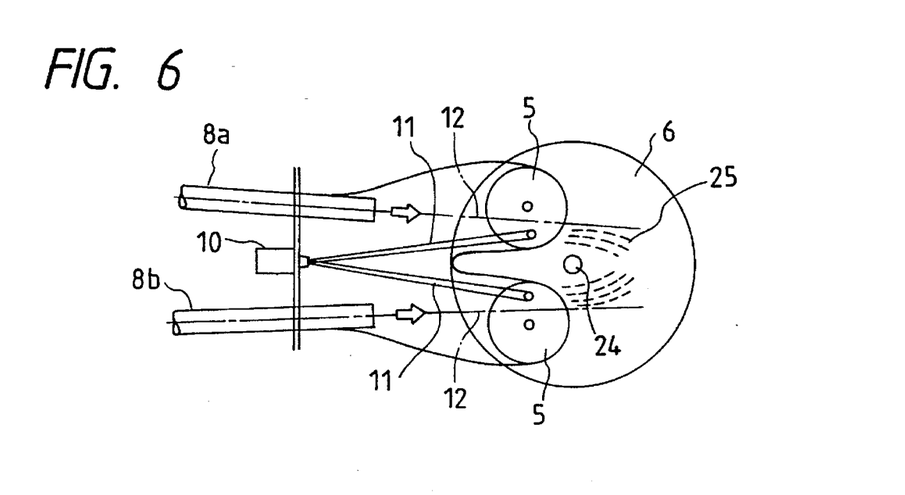
FIG. 6 is a schematic view showing the construction of an intake pipe seen from above.
Figure 7:
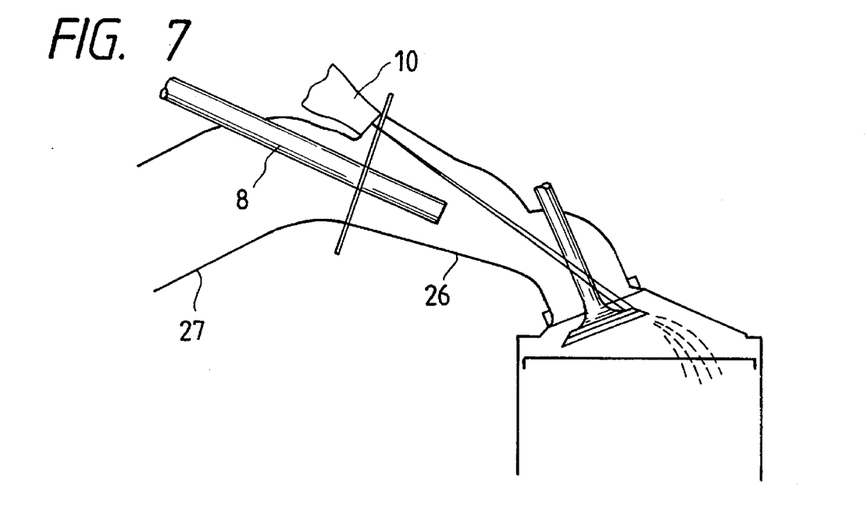
FIG. 7 is a longitudinal sectional view of the arrangement of FIG. 6.

FIG. 6 is a schematic view of the construction of an intake pipe seen from above, and FIG. 7 is a longitudinal sectional view of the arrangement of FIG. 6. The air flows 12 supplied from the air intake passage 8a and 8b are provided on the both sides of a fuel injection valve 10 so as to locate the fuel jet 11 between them. Further, the fuel jet 11 hits each intake valve at the inside portion thereof more than at the position where the air flow 12 hits. Thus, the fuel jet 11 is not dispersed toward the outside of the intake valve 5, and the fuel jet 11 is centralized. Namely, the air flow 12 acts as an air-curtain and prevents the fuel jet 11 from being dispersed. A fuel jet 25 flowing into a cylinder 6 is centralized in the neighborhood of an ignition plug 24. Therefore, even when the supplied air/fuel ratio is set to a lean condition, it becomes rich in the vicinity of the ignition plug 24. As a result, the plug 24 does not misfire, and a stable burn is obtained.

If the fuel injection valve is at the same height as the air intake passage 8, as shown in FIG. 2, it is necessary to machine the engine head and provide a notch 14 therein. However, if the air intake passage 8 is in the downstream side of the fuel injection valve 10 in the independent air intake pipe 27, it is possible to provide the air intake passage 8 without requiring a machining of the engine head 26.

Figure 8:
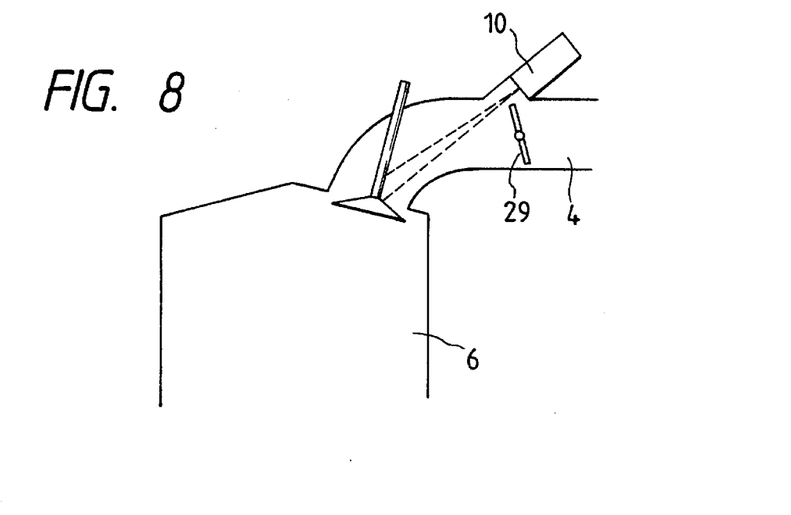
FIG. 8 is a schematic view of an arrangement of the intake pipe.
Figure 9:
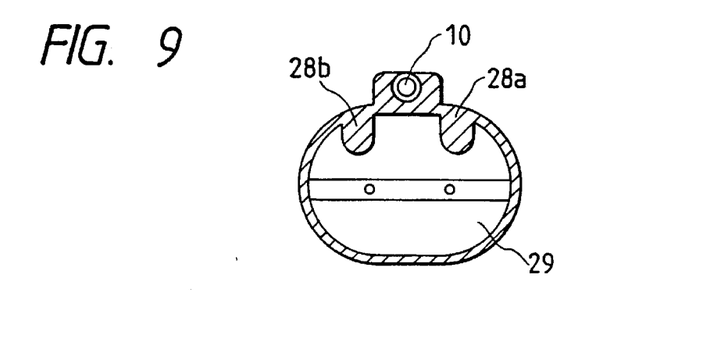
FIG. 9 is a front view of an auxiliary valve.

FIGS. 8 and 9 show another arrangement of the present invention, in which another method of producing an air swirl in the cylinder 6 is shown. The air flow is deflected by additionally providing an auxiliary valve 29 in the independent intake pipe 4. Namely, the air flow is deflected by notches of the auxiliary valve 29 as shown in FIG. 9. These notches is provided on both sides of the nozzle of the fuel injection valve 10. Thereby, the fuel jet from the fuel injection valve 10 is put between the air flows, thus centralized in the center of the cylinder.

Figure 10:
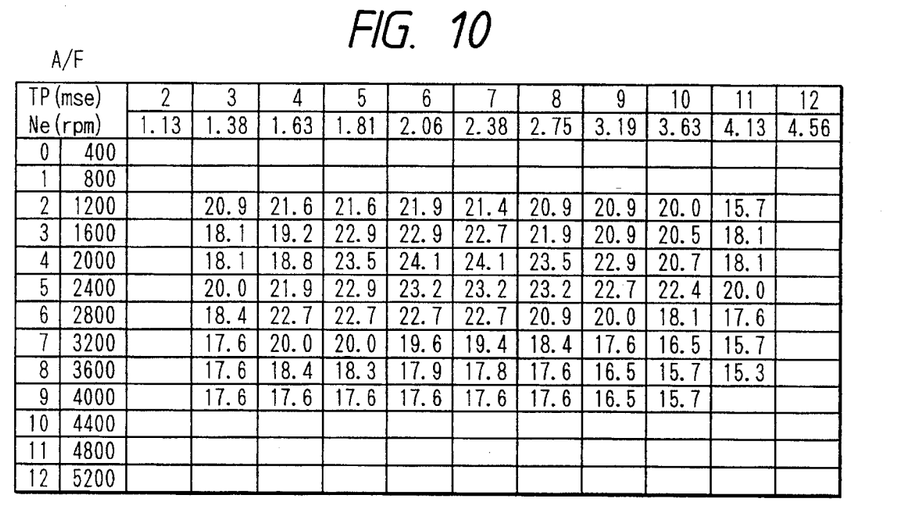
FIG. 10 is a map of the ratio of air to fuel for use in engine control.
Figure 11:
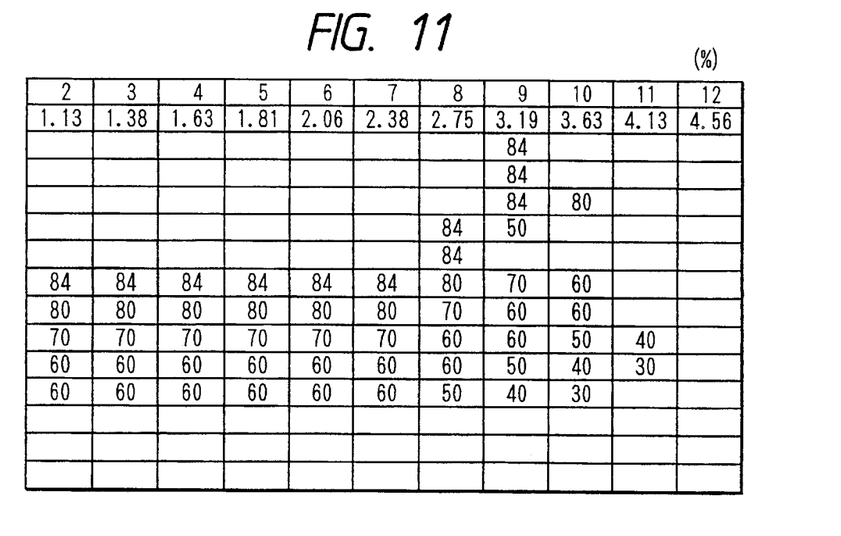
FIG. 11 is a map of the opening of the auxiliary valve for use in engine control.

Generally, the amount of the intake air, the amount of the fuel, and the air/fuel ratio are controlled by a micro-computer. In accordance with the present invention, the air/fuel ratio or the opening of the auxiliary valves 7 and 29 is written in memory as a map, and a control value is read out from the memory. FIG. 10 shows an example of a map of the ratio of the air to the fuel for use in the engine control. FIG. 11 show a map of the opening of the auxiliary valve for use in engine control. The abscissa designates the number Ne of the rotation of engine, and the ordinate designates the amount TP of fuel injection. The example of FIG. 10 is a map of the desired air/fuel ratio for the control of a lean burn in the engine, in which the air/fuel ratio is changed according to the operating conditions. The example of FIG. 11 a the map of the desired values of the openings of the auxiliary valves 7 and 29, in which the magnitude of the opening is proportional to that of the engine speed. Namely, the larger numeral value means a larger air amount which flows through the air intake passage. As described above, the opening of the auxiliary valves 7 and 29 is changed according to the operating conditions. It is, therefore, possible to obtain an optimum swirling air flow, and thus an optimum air/fuel ratio, according to the operating conditions.

Figure 12:
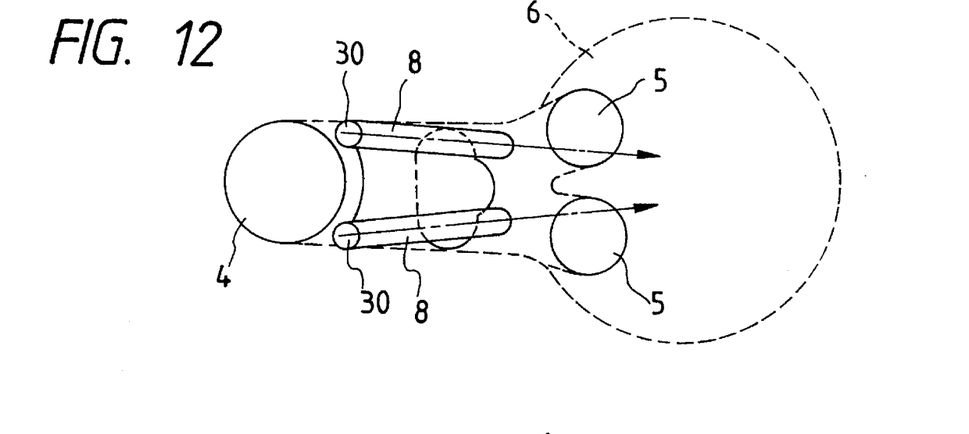
FIG. 12 is a schematic view of an arrangement of the intake pipe seen from the above.

FIG. 12 shows an arrangement of the present invention, in which two air intake passages 8 are directed to the inner side of the intake valve 5, so that an air swirl can be produced in a longitudinal direction of the cylinder 6. The air intake passage 8 does not disturb the main air flow, because it is provided at the end of the independent intake pipe 4. The opening portion 30 at the upper stream end of the air intake passage 8 extends into the collector on the upper stream side of the independent intake pipe 4.

Figure 13:
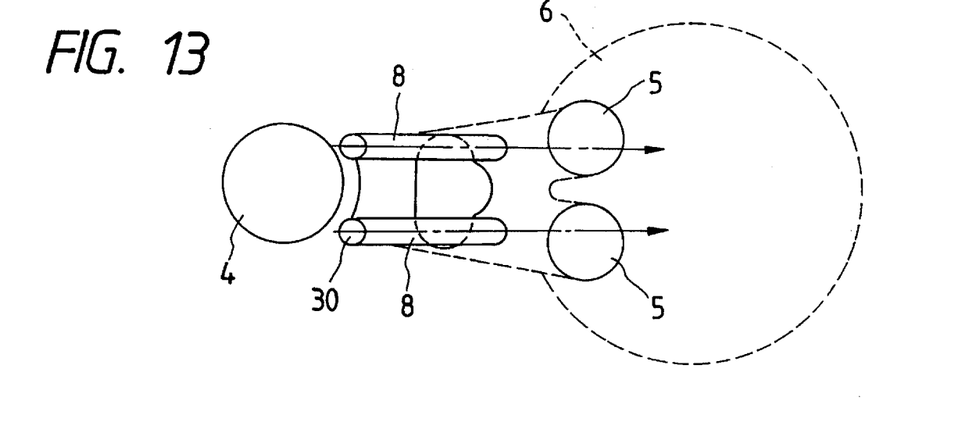
FIG. 13 is a schematic view of another arrangement of the intake pipe seen from the above.

FIG. 13 shows an arrangement of the present invention, in which two air intake passages 8 are provided in parallel with each other. By the construction shown in FIG. 13, the air flows do not collide in the cylinder 6, and it is ensured that an air swirl will be formed in the longitudinal direction.

Figure 14:
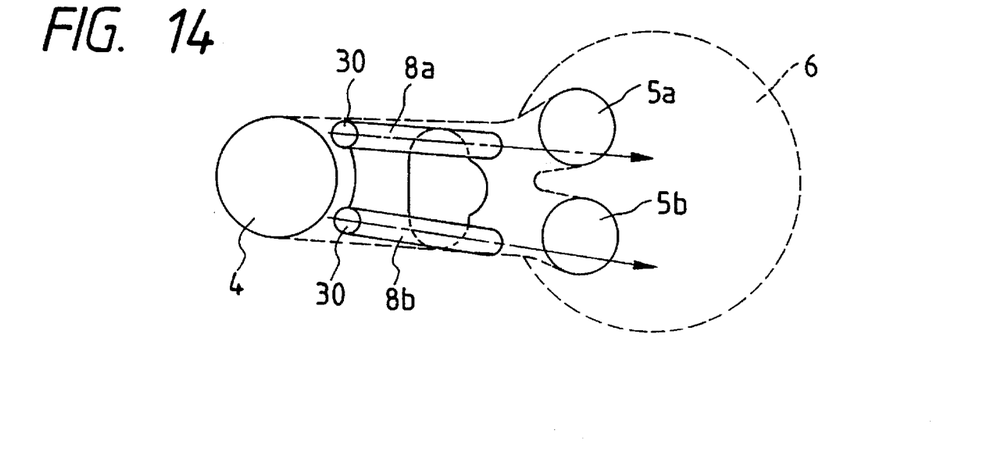
FIG. 14 is a schematic view of another arrangement of the intake pipe seen from the above.

FIG. 14 shows an arrangement of the present invention, in which one of the air intake passages 8a is directed into the inner side of the intake valve 5a, and the other air intake passage 8b is directed into the outer side of the intake valve 5b. Thereby, an air swirl is formed in a transverse direction. If the air intake passages 8a and 8b are inclined in a direction perpendicular to the surface of the drawing, it is possible to produce a slant air swirl in the cylinder 6.

Figure 15:
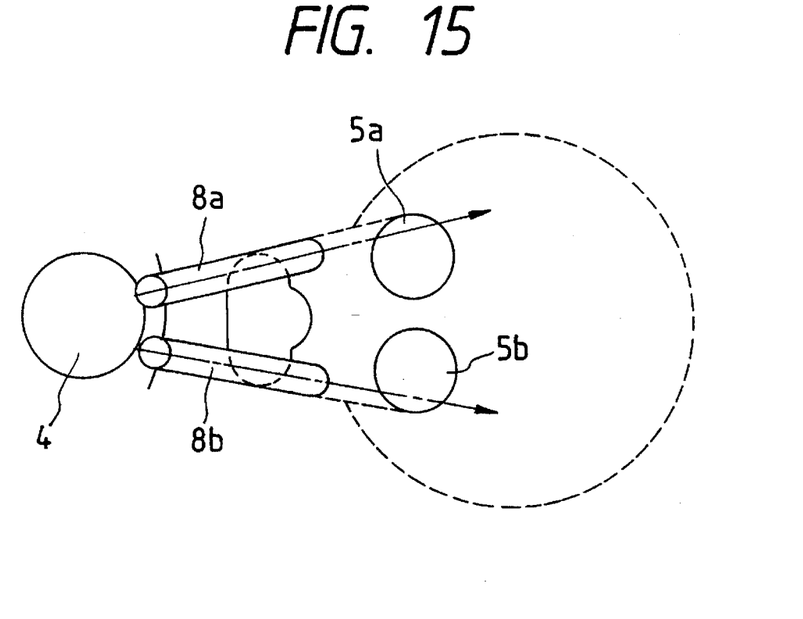
FIG. 15 is a schematic view of another arrangement of the intake pipe seen from the above.

FIG. 15 shows another arrangement of the present invention, in which the air intake passages 8a and 8b are directed into the outer side of the intake valves 5a and 5b, respectively. Thereby, double air swirls are formed in the cylinder 6.

Figure 16:
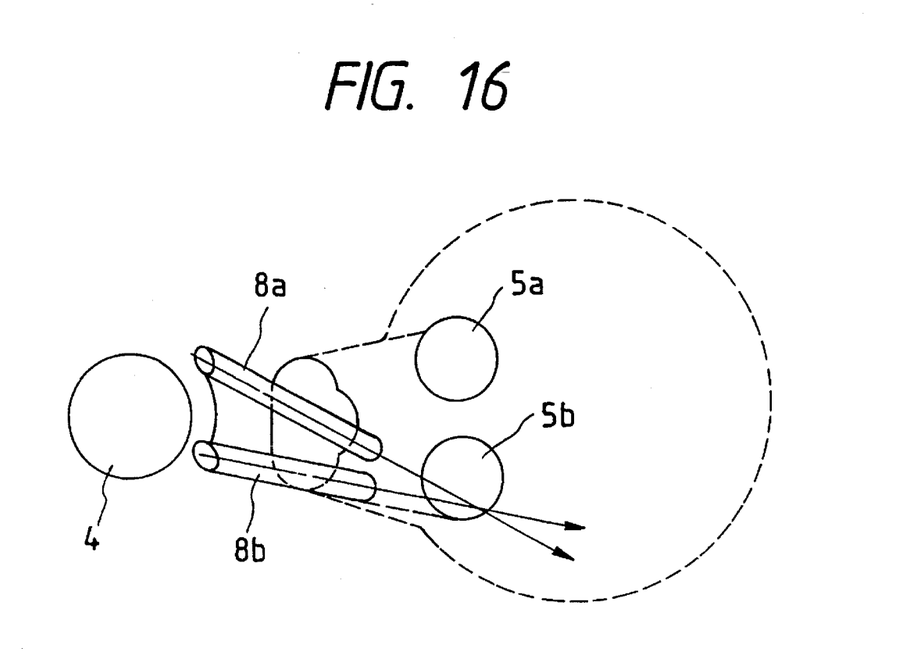
FIG. 16 is a schematic view of another arrangement of the intake pipe seen from the above.

FIG. 16 shows an arrangement of the present invention, in which the air intake passage 8a is directed into the outer side of the intake valve 5b, and the air intake passage 8b is directed into the outer side of the same intake valve 5b. Thereby, an air swirl is formed in the transverse direction or in the slant direction. By selecting the direction of the air intake passage as described above, the desired air swirls can be produced in the cylinder 6.

Figure 17:
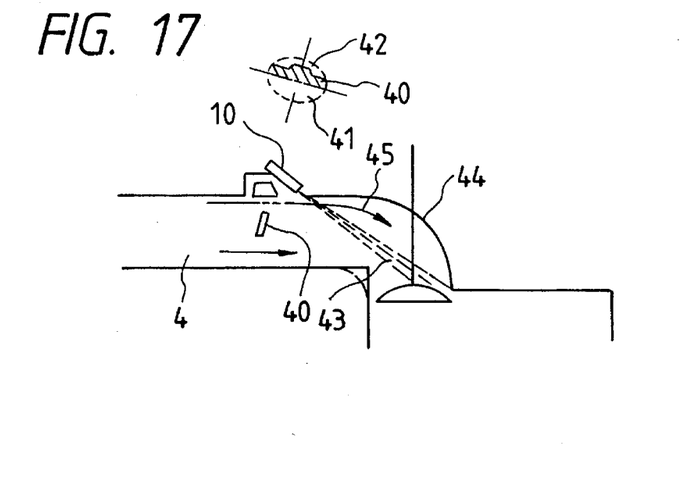
FIG. 17 is a schematic view of an arrangement of the present invention, showing the construction of the intake pipe seen from the side.
Figure 18:
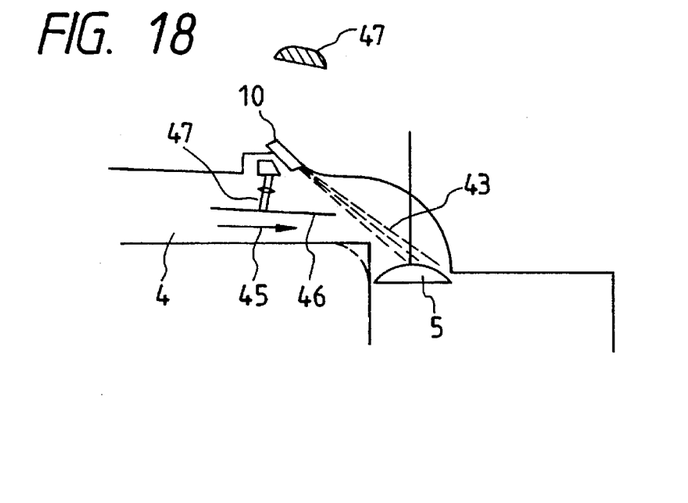
FIG. 18 is a schematic view of another arrangement showing the construction of the intake pipe seen from the side.
Figure 19:
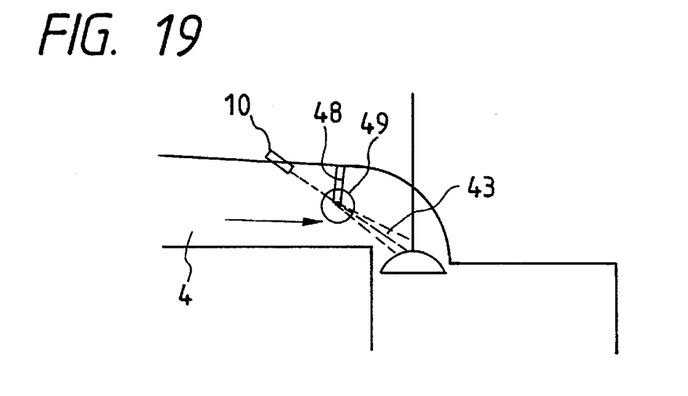
FIG. 19 is a schematic view of another arrangement showing the construction of the intake pipe seen from the side.

FIGS. 17 to 19 show the construction of an air intake pipe seen from the side, in which the auxiliary valve for supplying the deflecting flow to the intake air is provided in the independent intake valve 4. The auxiliary valve seen from the front is shown at the upper portion of the drawings.

FIG. 17 shows an arrangement in which the lower portion of the auxiliary valve 40 is cut out, and the air is deflected through a notch 41 of the cut out portion. However, because the deflected air flow is flowing at a high speed, it tends to cause the fuel jet 43 from the fuel injection valve 10 to deflect. As a result, the fuel jet will stick to the wall surface 44. A notch 42 is, therefore, provided at the upper portion of the auxiliary valve 40, in order to allow an air flow 45 for correcting the direction of flow of the fuel jet and prevent the fuel jet 43 from deflecting.

FIG. 18 shows an arrangement in which a partition wall 46 is provided in the independent intake pipe 4, and an auxiliary valve 47 is provided in the upper section of the passage above the partition wall. Because the high speed air flow for deflecting the intake air flows under the partition wall and collides with the fuel jet 43 only in the neighborhood of the intake valve 5, the fuel jet 43 will not be deflected by the high speed air flow.

FIG. 19 shows an arrangement of the present invention, in which the fuel jet 43 from the fuel injection valve 10 collides with the lower portion 49 of the auxiliary valve 48 and changes into fine particles. Even if the fuel jet is deflected by the air flow, the fine particles of the fuel do not stick to the wall surface of the independent intake pipe 4, but flow into the combustion chamber along with the intake air.

Figure 20:
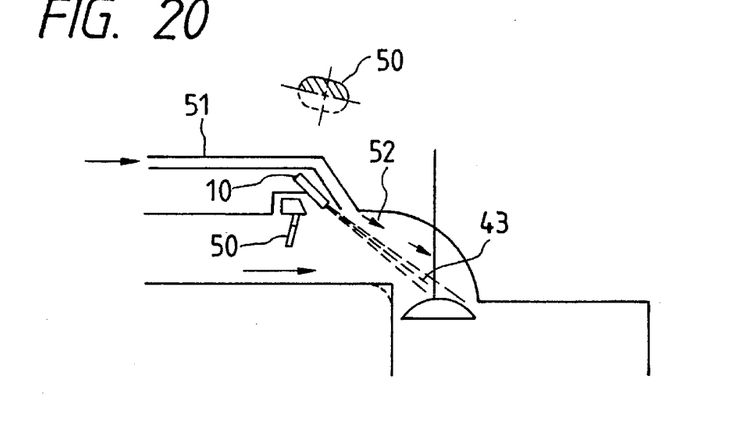
FIG. 20 is a schematic view of another arrangement showing the construction of the intake pipe seen from the side.
Figure 21:
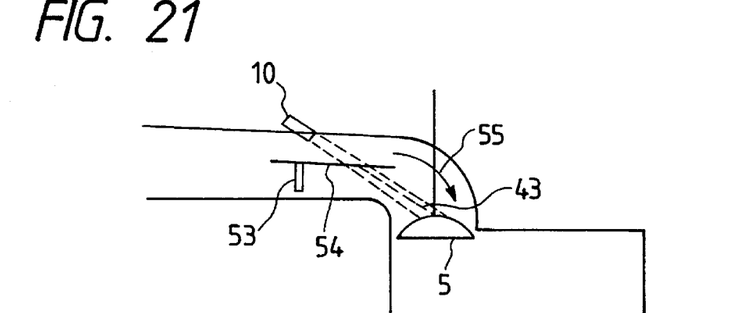
FIG. 21 is a schematic view of another arrangement showing the construction of the intake pipe seen from the side.
Figure 22:
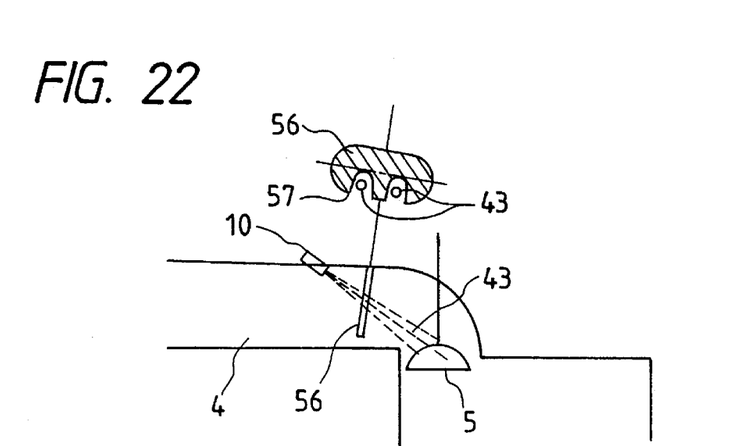
FIG. 22 is a schematic view of another arrangement showing the construction of the intake pipe seen from the side.

FIGS. 20 to 22 show the construction of the intake pipe seen from the side, in which an auxiliary valve is provided in the independent intake pipe 4.

FIG. 20 shows an arrangement of the present invention, in which a part of an auxiliary valve 50 is cut away and the intake air is deflected. Against the deflected high speed air flow, a high speed air flow 52 from an air intake passage 51 is supplied to the side opposite to the fuel jet 43. The high speed air flow 52 prevents the fuel jet 43 from deflecting. The high speed air flow 52 is obtained by providing a by-pass passage to the throttle valve or the auxiliary valve 50.

FIG. 21 shows an arrangement of the present invention, in which a partition wall is provided in the independent intake pipe 4 and an auxiliary valve 53 is provided under the partition wall, thereby an air flow 55 can be produced. Because the air flow 55 collides with the fuel jet 43 in the neighborhood of the intake valve 5, the fuel jet 43 will not be deflected.

FIG. 22 shows another arrangement of the present invention, in which a notch 57 is provided in an auxiliary valve 56 and at the position corresponding to that where a fuel jet 43 passes. Because the fuel jet 43 and the high speed air flow for deflecting the fuel jet flow together through the notch 57, the fuel jet 43 will not be deflected but will flow in the same direction as the air flow. By setting the direction to which the air flow and the fuel jet 43 flies to the desired direction, the good mixture distribution can be obtained while forming an air swirl in the cylinder.

Although FIGS. 17, 19, 20 and 22 have shown a construction in which a notch is provided in the tower portion of the auxiliary valve, it is also possible to provide it in the upper portion of the auxiliary valve. Further, in FIG. 17, it should be understood that the notch can be provided in the lower portion, which produces the air flow for preventing the fuel jet from deflecting. Furthermore, in FIG. 19, it should be understood that the notch of the auxiliary valve can be provided in the upper portion, and the fuel jet can be allowed to collide with the upper end, thus producing fine particles. Further, in FIG. 20, it should be understood that the notch of the auxiliary valve can be provided in the upper portion, and the passage which produces the air flow for correcting the direction of the fuel jet can be provided in the lower portion. In FIG. 22, it should be understood that the notch can be provided in the upper portion. Furthermore, in the arrangements shown in FIGS. 17 to 22 the fuel jet has been directed in two directions. However, even if the fuel jet is directed in one direction, the same effect can be obtained.

We claim:

1. An air intake system for an internal combustion engine comprising:

a plurality of independent intake pipes, connected to a combustion chamber of the internal combustion engine via an intake valve, for introducing air into said combustion chamber;

collectors, connected to said independent intake pipes, for distributing intake air to said intake pipes;

a throttle valve, connected in an air passage to said collectors, for controlling the amount of intake air flow in said air passage;

fuel supplying means, provided on a wall of said independent intake pipes, for supplying fuel to the air supplied by said intake pipes and mixing the air and fuel; and deflection means for deflecting the air flow of said independent intake pipes whereby the direction of fuel flow supplied from said fuel supplying means is constant, independent of the presence of said air flow;

further comprising valve means provided on the upper stream of a fuel nozzle of said fuel supplying means in said independent intake pipes, wherein said deflection means comprises a by-pass passage which by-passes said valve means;

wherein air flow jetted through the by-pass passage is directed to a predetermined position on the surface of the intake valve of the internal combustion engine; and wherein the distances between points at the opening portions of the upper stream end and the down stream end of the by-pass through the by-pass and through said independent intake pipe are substantially equal.

2. An air intake system for an internal combustion engine comprising:

a plurality of independent intake pipes, connected to a combustion chamber of the internal combustion engine via an intake valve, for introducing air into said combustion chamber;

collectors, connected to said independent intake pipes, for distributing intake air to said intake pipes;

a throttle valve, connected in an air passage to said collectors, for controlling the amount of intake air flow in said air passage;

fuel supplying means, provided on a wall of said independent intake pipes, for supplying fuel to the air supplied by said intake pipes and mixing the air and fuel; and deflection means for deflecting the air flow of said independent intake pipes whereby the direction of fuel flow supplied from said fuel supplying means is constant, independent of the presence of said air flow;

further comprising valve means provided on the upper stream of a fuel nozzle of said fuel supplying means in said independent intake pipes, wherein said deflection means comprises a by-pass passage which by-passes said valve means;

wherein air flow jetted through the by-pass passage is directed to a predetermined position on the surface of the intake valve of the internal combustion engine; and wherein said upstream opening portion of said by-pass extends into a collector connected to the independent intake pipe in which the downstream opening portion of said by-pass extends.

* * * * *